(12) United States Patent
Jiang

(10) Patent No.: US 11,067,817 B2
(45) Date of Patent: Jul. 20, 2021

(54) OPTICAL ELEMENT ROTATING DEVICE AND STAGE LIGHT OPTICAL DEVICE

(71) Applicant: GUANGZHOU HAOYANG ELECTRONIC CO., LTD., Guangdong (CN)

(72) Inventor: Weikai Jiang, Guangdong (CN)

(73) Assignee: GUANGZHOU HAOYANG ELECTRONIC CO., LTD. (CN), Guangdong (CN)

( * ) Notice: Subject to any disclaimer, the term of this patent is extended or adjusted under 35 U.S.C. 154(b) by 190 days.

(21) Appl. No.: 16/263,792

(22) Filed: Jan. 31, 2019

(65) Prior Publication Data
US 2019/0162974 A1     May 30, 2019

Related U.S. Application Data

(63) Continuation of application No. PCT/CN2017/097002, filed on Aug. 17, 2017.

(30) Foreign Application Priority Data

Aug. 30, 2016   (CN) .......................... 201610759165.6

(51) Int. Cl.
*G02B 7/18*     (2021.01)
*G02B 27/09*    (2006.01)
(Continued)

(52) U.S. Cl.
CPC .......... *G02B 27/0972* (2013.01); *F21V 21/30* (2013.01); *G02B 7/004* (2013.01);
(Continued)

(58) Field of Classification Search
CPC ...... G02B 27/0972; G02B 7/004; G02B 7/18; G02B 7/023; G02B 7/026; G02B 7/027;
(Continued)

(56) References Cited

U.S. PATENT DOCUMENTS

| 6,601,973 | B2 * | 8/2003 | Rasmussen | ............... F21V 9/40 |
| | | | | 362/282 |
| 2006/0113867 | A1 * | 6/2006 | Sakatani | ............... G02B 7/023 |
| | | | | 310/323.17 |

(Continued)

OTHER PUBLICATIONS

Su Jianchi, CN 204061806, 2014, WIPO (Year: 2014).*
Yin Yongjian, CN 201031946, 2008, WIPO (Year: 2008).*

*Primary Examiner* — Stephone B Allen
*Assistant Examiner* — Gabriel A Sanz
(74) *Attorney, Agent, or Firm* — Muncy, Geissler, Olds & Lowe, P.C.

(57) ABSTRACT

The present invention provides an optical element rotating device, which is simple in structure and convenient in use, and can prevent the stuck phenomenon of the rotating motion of the optical element main body from affecting the using effect of the stage light, comprising a base body, a ball holder, a ball, a ball pressing plate, an elastic element, and a cover, wherein the ball holder is sleeved outside the periphery of the base body; and the ball, the ball pressing plate, the elastic element and the cover are sequentially positioned between the ball holder and the base body from bottom to top. A stage light optical device is also disclosed, comprising an optical element main body and the rotating device, wherein the optical element main body is positioned on the base body of the rotating device.

10 Claims, 4 Drawing Sheets

(51) Int. Cl.
*F21V 21/30* (2006.01)
*G02B 7/00* (2021.01)
*G02B 7/02* (2021.01)
*G02B 26/00* (2006.01)

(52) U.S. Cl.
CPC ............. *G02B 7/023* (2013.01); *G02B 7/026* (2013.01); *G02B 7/027* (2013.01); *G02B 7/18* (2013.01); *G02B 26/008* (2013.01)

(58) Field of Classification Search
CPC ....... G02B 26/008; F21V 21/30; F21V 17/02; F21V 14/06; F21V 14/08; F21S 10/007; F21W 2131/105
See application file for complete search history.

(56) References Cited

U.S. PATENT DOCUMENTS

2014/0355279 A1* 12/2014 Chung .................... F21S 6/006
362/427
2016/0154252 A1* 6/2016 Miller .................... G02B 7/023
359/557

* cited by examiner

OPTICAL ELEMENT ROTATING DEVICE AND STAGE LIGHT OPTICAL DEVICE

CROSS REFERENCE TO RELATED APPLICATIONS

The present application is a continuation of International Application No. PCT/CN2017/097002, filed on Aug. 11, 2017, which claims priority from Chinese Patent Application No. 201610759165.6 filed on Aug. 30, 2016, all of which are hereby incorporated herein by reference.

TECHNICAL FIELD

The present invention relates to the technical field of stage light, and more particularly to an optical element rotating device and a stage light optical device including the same.

BACKGROUND OF THE INVENTION

In the technical field of stage lighting, it is usually necessary to use various optical elements for more stage lighting effects, such as a pattern sheet or prism sheet. And such optical elements usually need to have a rotation function in order to enrich the performance effect, so that a ball bearing component is generally configured in the optical element device. While the temperature of the ball groove will rise continuously due to the relatively high temperature of the optical element position on the stage light, causing the ball to expand and contract with heat and cold. However, in the prior art, the ball bearing component in the optical element device still applies traditional ball bearing, in which the ball and the ball groove are closely engaged without space for elastic adjustment. Therefore, in such configuration, the ball will be stuck tightly when in the case of thermal expansion and contraction, resulting that the optical element will be stuck with unsmooth movement during rotation, which will affect the using effect of the stage light.

SUMMARY OF THE INVENTION

It's therefore an object of the present invention to provide a rotating device and a stage light to overcome at least one of the above-mentioned drawbacks in the prior art, which is simple in structure and convenient in use, and can prevent the stuck phenomenon of the rotating motion of main body of the stage light optical element from affecting the using effect of the stage light.

An optical element rotating device according to the present invention comprises a base body, a ball holder, a ball, a ball pressing plate, an elastic element, and a cover, wherein the ball holder is sleeved on the base body; the ball, the ball pressing plate, the elastic element and the cover are sequentially positioned between the ball holder and the base body from bottom to top, in which the cover is positioned on the uppermost layer to prevent dust and the like from entering the space between the ball holder and the base body and affecting the movement of the ball. When the ball expands with heat, the ball will apply a force to the ball pressing plate which will apply a force to the elastic element which is then compressed by the ball pressing plate and the cover, so that the position between the ball and the base body can be adjusted moderately through the adjustment of the elastic element, the base body thus will not be stuck too tight when in rotating motion relative to the ball, preventing the stuck phenomenon of the rotating motion of the base body from affecting the using effect of the elements installed thereon. When the ball contracts with cold, the elastic element will release elastic force and the elastic element applies a force to the ball pressing plate, so that the ball pressing plate applies a force to the ball, and then compresses the ball, which is not compressed too tightly, the stuck phenomenon of rolling is thus avoided and the rotating motion of the base body is smooth.

Further, a first ball groove is arranged at a position, corresponding to the ball, on the peripheral sidewall of the base body. Specifically, a first arc gap is arranged at a position, corresponding to the ball, on the inner side of the ball holder, and a second arc gap is arranged on the ball pressing plate corresponding to the ball. The first arc gap and the second arc gap constitute a second ball groove, and the ball is positioned between the first ball groove and the second ball groove. The first ball groove and the second ball groove are both engaged with the surface of the ball, so that the movement of the ball is restricted in the space formed by the first ball groove and the second ball groove, and thus the rotation of the base body relative to the ball will be more stable.

Further, a pressing plate groove and a cover groove are respectively arranged at a position on the inner side of the ball holder corresponding to the ball pressing plate and the cover. The ball pressing plate is positioned in the pressing plate groove of the ball holder. And the height of the pressing plate groove is larger than the height of the ball pressing plate, so as to leave an activity space for the ball pressing plate to prevent the ball from being stuck too tight or too loose when the ball is in thermal expansion and contraction, which will cause the stuck phenomenon or the unsmooth movement of the base body when in rotation and affect the using effect of element installed on the base body. The cover is embedded in the cover groove of the ball holder. The cover is provided with a slit as a preferred solution and has a slight elasticity, so that the cover can be easily installed on the cover groove of the ball holder by opening the slit with the slight elasticity of the cover.

Further, the elastic element is positioned between the ball pressing plate and the cover, and both sides of the elastic element are respectively in close contact with the ball pressing plate and the cover. In this configuration, when the ball is in thermal expansion and contraction, the elastic element adjusts the position between the ball and the base body moderately by being compressed or releasing elastic force, so as to prevent the stuck phenomenon of the rotating motion of the base body from affecting the using effect of the element installed thereon.

Further, the elastic element can be any elastic element, such as an elastic washer, a rubber ring, and a spring, and a wave washer is preferred in the present invention. In the present invention, the ball pressing plate, the elastic element and the cover are preferably in annular shape.

The present invention further provides a stage light optical device, wherein the stage light optical device includes an optical element main body and the above-described rotating device, and the base body of the rotating device is positioned on the optical element main body. The stuck phenomenon of the rotating motion of the optical element main body, which will affect the using effect of the stage light, can be avoided by applying the rotating device. Notably the above-mentioned rotating device is not limited to apply to the stage light, and also can be applied to any equipment element that needs to have a rotation function. Further, the optical element main body includes an optical element body and an optical element holder, and the optical element body is installed on the optical element holder.

Further, the optical element main body is a pattern assembly or a prism assembly in a stage light.

Compared with the prior art, some beneficial effects of the present invention can be obtained.

The ball pressing plate of the rotating device according to the present invention is configured to be movable sets, and an elastic element is arranged between the ball pressing plate and the cover, so that the position between the ball and the base body can be adjusted moderately through the adjustment of the elastic element when the ball is in thermal expansion and contraction, therefore, the base body will not be stuck too tight or too loose when in rotating motion relative to the ball, thus preventing the stuck phenomenon of the rotating motion of the base body from affecting the using effect of the element installed thereon. Additionally, the stuck phenomenon of the rotating motion of the optical element main body positioned on the base body of the rotating device can be prevented from affecting the using effect of the stage light by applying the rotating device of the present invention to the stage light optical device.

DESCRIPTION OF EMBODIMENTS

Figure 1:
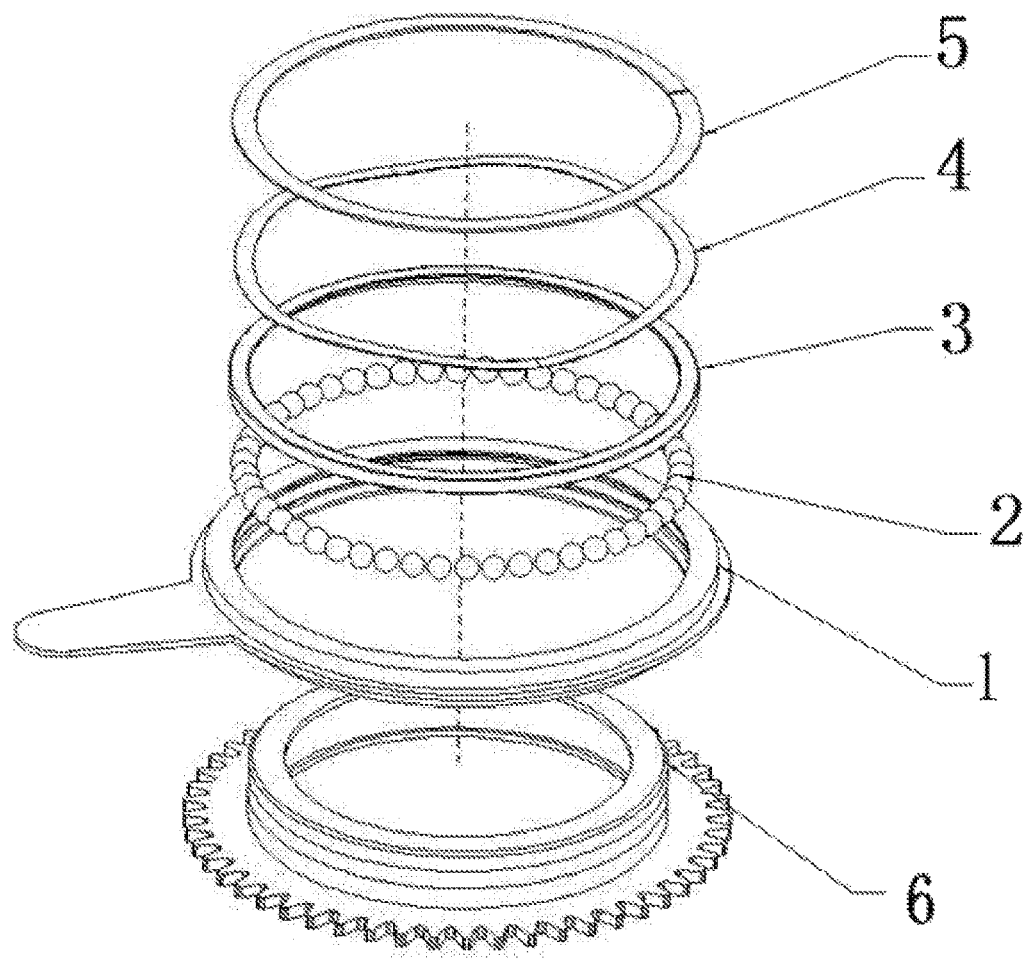
FIG. 1 is a schematic exploded view of an embodiment according to the present invention.
Figure 2:
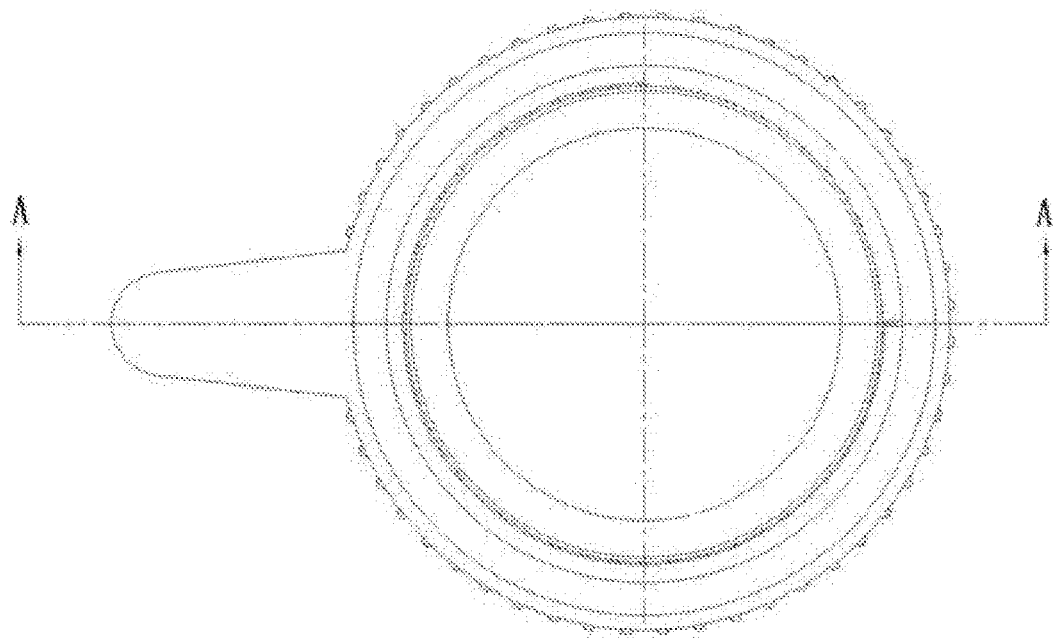
FIG. 2 is a plan view of the embodiment.
Figure 3:
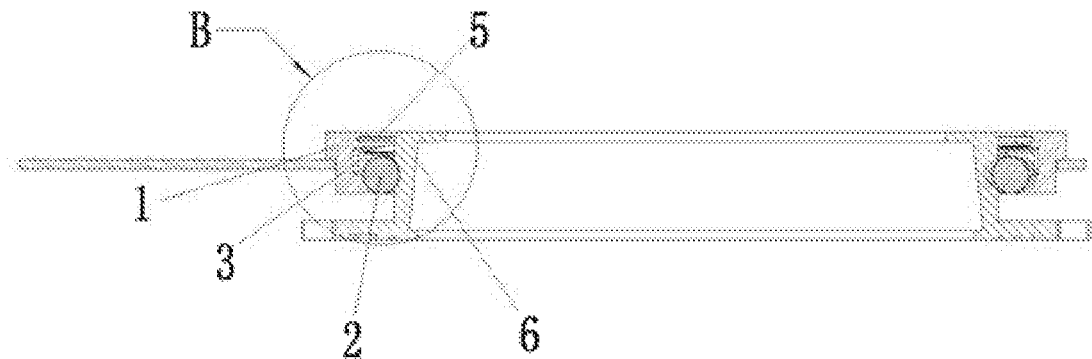
FIG. 3 is a schematic cross-sectional view taken along line A-A of FIG. 2.

The drawings are for illustration purpose only and are not intended to limit the present invention. Some components in the drawings are omitted, enlarged or reduced for better illustrating the embodiments, and sizes of these components do not represent sizes of actual product. For those skilled in the art, it will be understood that some known structures in the drawings and descriptions thereof are omitted. The positional relationships described in the drawings are for illustration purpose only and are not intended to limit the present invention.

Embodiment 1

As shown in FIGS. 1 to 5, an optical element rotating device according to the embodiment comprises a base body 6, a ball holder 1, a ball 2, a ball pressing plate 3, an elastic element 4, and a cover 5, wherein the ball holder 1 is sleeved on the base body 6; the ball 2, the ball pressing plate 3, the elastic element 4 and the cover 5 are sequentially positioned between the ball holder 1 and the base body 6 from bottom to top, in which the cover 5 is positioned on the uppermost layer to prevent dust and the like from entering the space between the ball holder 1 and the base body 6 and affecting the movement of the ball 2. When the ball 2 expands with heat, the ball 2 will apply a force to the ball pressing plate 3 which will apply a force to the elastic element 4 which is then compressed by the ball pressing plate 3 and the cover 5, so that the position between the ball 2 and the base body 6 can be adjusted moderately through the adjustment of the elastic element 4, the base body 6 thus will not be stuck too tight when in rotating motion relative to the ball 2, preventing the stuck phenomenon of the rotating motion of the base body 6 from affecting the using effect of the element installed thereon. When the ball 2 contracts with cold, the elastic element 4 will release elastic force and the elastic element 4 applies a force to the ball pressing plate 3, so that the ball pressing plate 3 applies a force to the ball 2, and then compresses the ball 2, which is not compressed too tightly, the stuck phenomenon of rolling is thus avoided and the movement of the base body 6 is smooth.

Figure 6:
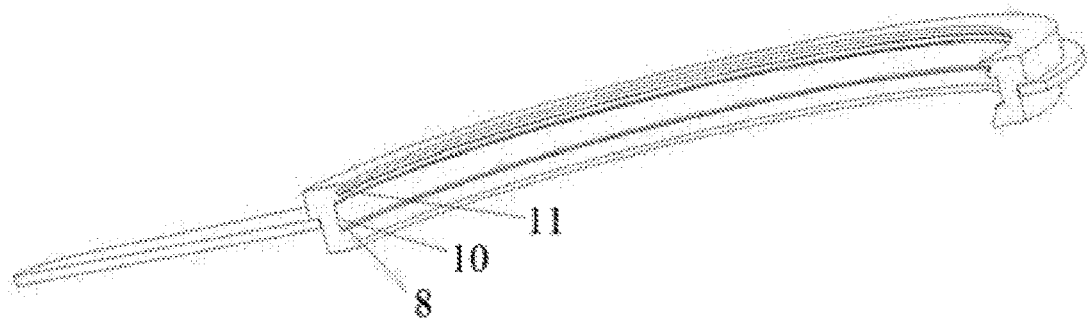
FIG. 6 is a cross-sectional view of a ball holder according to the embodiment.
Figure 7:
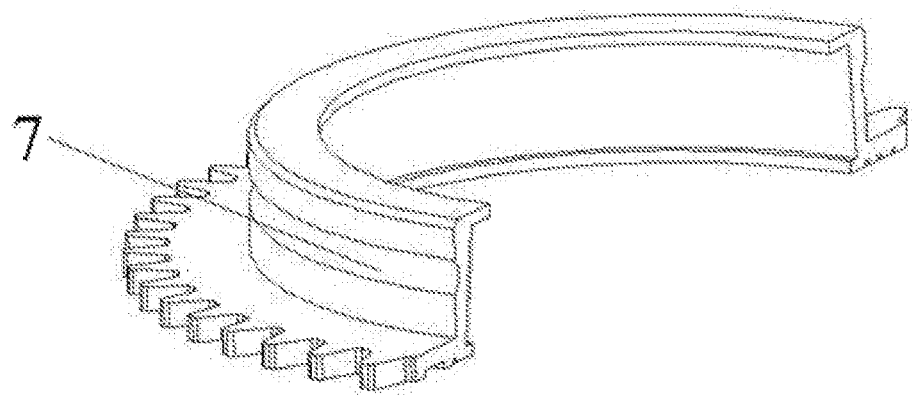
FIG. 7 is a cross-sectional view of a base according to the embodiment.
Figure 8:
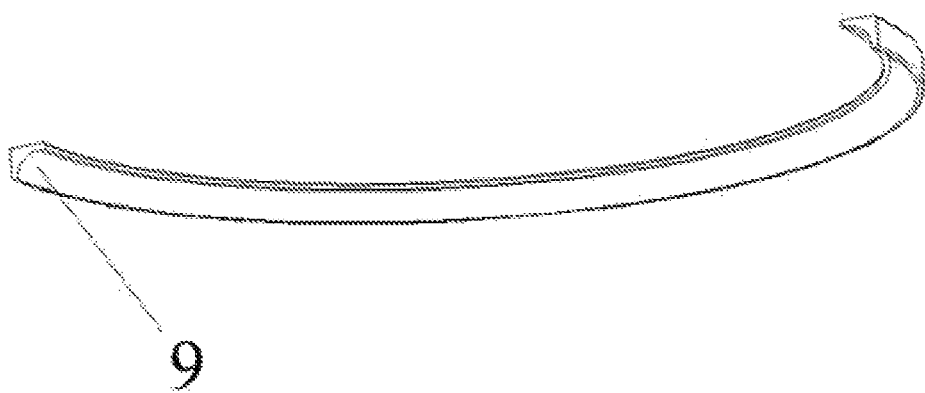
FIG. 8 is a cross-sectional view of a ball pressing plate according to the embodiment.

As shown in FIGS. 6 to 8, a first ball groove 7 is arranged at a position, corresponding to the ball 2, on the peripheral sidewall of the base body 6. A first arc gap 8 is arranged at a position, corresponding to the ball 2, on the inner side of the ball holder 1, and a second arc gap 9 is arranged on the ball pressing plate 3 corresponding to the ball 2. The first arc gap 8 and the second arc gap 9 define a second ball groove, and the ball 2 is positioned between the first ball groove 7 and the second ball groove. The first ball groove 7 and the second ball groove are both engaged with the surface of the ball 2, so that the movement of the ball 2 is restricted in the space formed by the first ball groove 7 and the second ball groove, and thus the rotation of the base body 6 relative to the ball 2 will be more stable.

As shown in FIGS. 3 to 6, a pressing plate groove 10 and a cover groove 11 are respectively arranged at a position on the inner side of the ball holder 1 corresponding to the ball pressing plate 3 and the cover 5. The ball pressing plate 3 is positioned in the pressing plate groove 10 of the ball holder 1. And the height of the pressing plate groove 10 is larger than the height of the ball pressing plate 3, so as to leave an activity space for the ball pressing plate 3 to prevent the ball 2 from being stuck too tight or too loose when the ball 2 is in thermal expansion and contraction, which will cause the stuck phenomenon or unsmooth movement of the base body 6 when in rotation, and affect the using effect of element installed on the base body 6. The cover 5 is embedded on the cover groove 11 of the ball holder 1. The cover 5 is provided with a slit, and the cover 5 has slight elasticity, so that the cover 5 can be easily installed on the cover groove 11 of the ball holder 1 by opening the slit with the slight elasticity of the cover 5.

Figure 4:
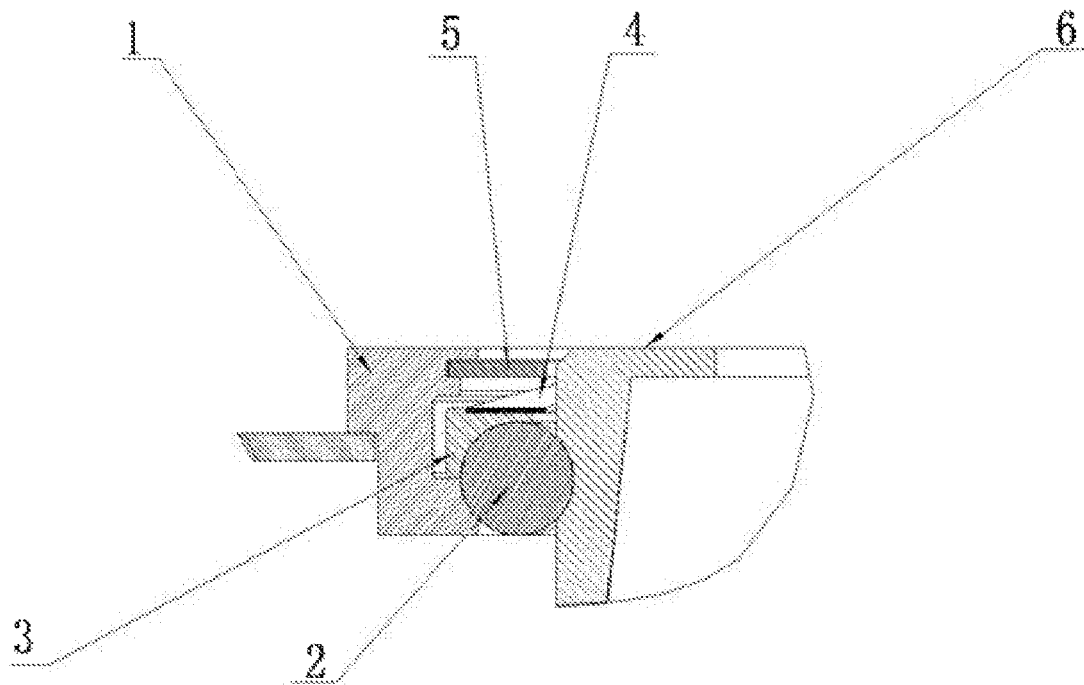
FIG. 4 is a partial enlarged view of portion B in FIG. 3.
Figure 5:
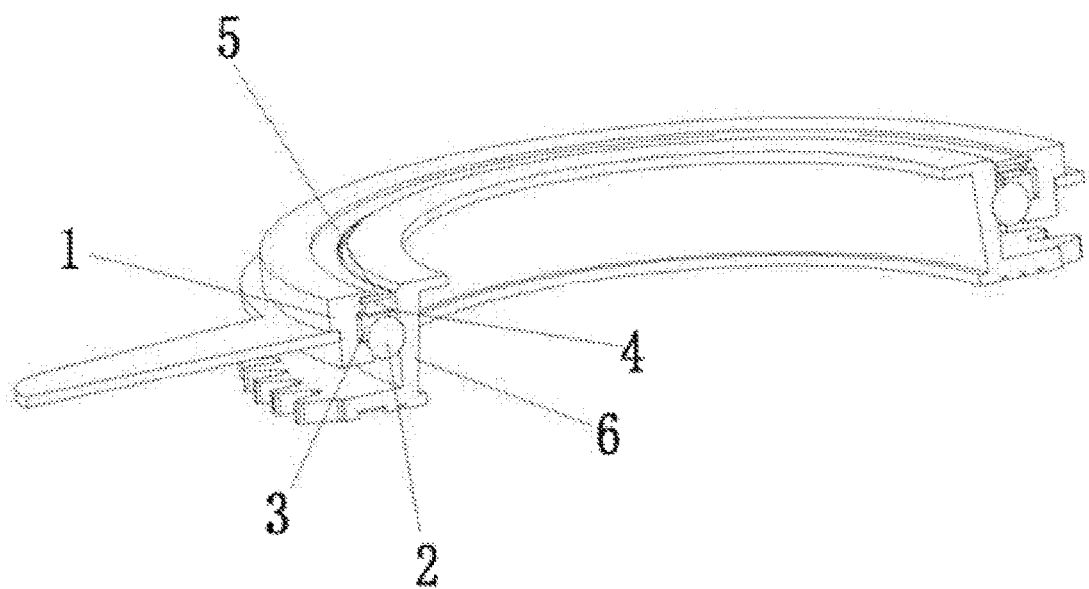
FIG. 5 is a cross-sectional schematic perspective view taken along line A-A of FIG. 2.

As shown in FIGS. 4 and 5, the elastic element 4 is positioned between the ball pressing plate 3 and the cover 5, and both sides of the elastic element 4 are respectively in close contact with the ball pressing plate 3 and the cover 5. In this configuration, when the ball 2 is in thermal expansion and contraction, the elastic element 4 adjusts the position between the ball 2 and the base body 6 moderately by being compressed or releasing elastic force, so as to prevent the stuck phenomenon of the rotating motion of the base body 6 from affecting the using effect of the element installed thereon.

The elastic element 4 can be any elastic element, such as an elastic washer, a rubber ring, and a spring, and a wave washer is preferred in this embodiment.

In this embodiment, the ball pressing plate 3, the elastic element 4, and the cover 5 are preferably in annular shape.

Embodiment 2

The present embodiment provides a stage light optical device, wherein the stage light includes an optical element main body and a rotating device described in the embodiment 1, and the optical element main body is positioned on the base body 6 of the rotating device. The stuck phenomenon of the rotating motion of the optical element main body, which will affect the using effect of the stage light, can be avoided by applying the rotating device. Notably, the rotating device described in the embodiment 1 is not limited to apply to the stage light optical device, and can also be applied to any equipment element that needs to have a rotation function.

In this embodiment, the optical element main body includes an optical element body and an optical element holder, and the optical element body is installed on the optical element holder.

In this embodiment, the optical element main body is a pattern assembly or a prism assembly in a stage light.

Obviously, the above embodiments of the invention are merely examples for clear illustration of the invention, and are not intended to limit the implementation of the invention. Modifications or changes can be made by those ordinary skilled in the art on the basis of the above description. There is neither need nor exhaustion for all implementations. Any modification, equivalent substitution, improvement, or the like within the spirit and principle of the invention should be included in the scope of the claims of the invention.

What is claimed is:

1. An optical element rotating device, comprising:
   a base body,
   a ball holder,
   a ball,
   a ball pressing plate,
   an elastic element, and
   a cover,
   wherein the ball holder is sleeved on the base body; and the ball, the ball pressing plate, the elastic element and the cover are sequentially positioned between the ball holder and the base body from bottom to top,
   wherein a first ball groove is arranged at a position, corresponding to the ball, on a peripheral sidewall of the base body.

2. The optical element rotating device according to claim 1,
   wherein a first arc gap is arranged at a position, corresponding to the ball, on an inner side of the ball holder,
   wherein a second arc gap is arranged on the ball pressing plate corresponding to the ball,
   wherein the first arc gap and the second arc gap constitute a second ball groove, and
   wherein the ball is positioned between the first ball groove and the second ball groove.

3. The optical element rotating device according to claim 1,
   wherein a pressing plate groove and a cover groove are respectively arranged at a position on the inner side of the ball holder, corresponding to the ball pressing plate and the cover,
   wherein the ball pressing plate is positioned in the pressing plate groove of the ball holder, a vertical height of the pressing plate groove is larger than a vertical height of the ball pressing plate, and
   wherein the cover is embedded in the cover groove of the ball holder.

4. The optical element rotating device according to claim 3, wherein the elastic element is positioned between the ball pressing plate and the cover, and both sides of the elastic element are respectively in close contact with the ball pressing plate and the cover.

5. The optical element rotating device according to claim 4, wherein the elastic element is an elastic washer, a rubber ring, a wave washer, or a spring.

6. The optical element rotating device according to claim 1, wherein the cover is provided with a slit and the cover has slight elasticity.

7. The optical element rotating device according to claim 1, wherein the ball pressing plate, the elastic element, and the cover are all in annular shape.

8. The optical element rotating device according to claim 1, wherein when the ball expands with heat generated by the optical element, the ball applies a first force to the ball pressing plate which will apply a second force to the elastic element that is then compressed by the ball pressing plate and the cover, so that the position between the ball and the base body is adjusted through the adjustment of the elastic element; and
   wherein when the ball contracts with cold as the optical element is not in operation, the elastic element releases elastic force and applies a third force to the ball pressing plate, so that the ball pressing plate applies a fourth force to the ball and compresses the ball.

9. A stage light optical device, comprising an optical element main body and the optical element rotating device according to claim 1, wherein the optical element main body is positioned on the base body of the optical element rotating device.

10. The stage light optical device according to claim 9, wherein the optical element main body is a pattern assembly or a prism assembly.

* * * * *